US012261368B2

(12) United States Patent
Yamaguchi et al.

(10) Patent No.: US 12,261,368 B2
(45) Date of Patent: Mar. 25, 2025

(54) ANTENNA DEVICE AND COMMUNICATION DEVICE

(71) Applicant: Murata Manufacturing Co., Ltd., Nagaokakyo (JP)

(72) Inventors: Ryusuke Yamaguchi, Nagaokakyo (JP); Takaya Nemoto, Nagaokakyo (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 133 days.

(21) Appl. No.: 17/875,425

(22) Filed: Jul. 28, 2022

(65) Prior Publication Data

US 2022/0368030 A1 Nov. 17, 2022

Related U.S. Application Data

(63) Continuation of application No. PCT/JP2021/002074, filed on Jan. 21, 2021.

(30) Foreign Application Priority Data

Jan. 30, 2020 (JP) ................................ 2020-014028

(51) Int. Cl.
*H01Q 21/06* (2006.01)
*H01Q 1/48* (2006.01)
*H01Q 19/10* (2006.01)

(52) U.S. Cl.
CPC ............. *H01Q 21/065* (2013.01); *H01Q 1/48* (2013.01); *H01Q 19/10* (2013.01)

(58) Field of Classification Search
CPC ........ H01Q 21/065; H01Q 1/48; H01Q 19/10; H01Q 1/243
See application file for complete search history.

(56) References Cited

U.S. PATENT DOCUMENTS 10,784,593 B1 * 9/2020 Sims, III ................ H01Q 21/30
2019/0089052 A1 * 3/2019 Yong .................... H01Q 9/0407
(Continued)

FOREIGN PATENT DOCUMENTS

JP 6-6130 A 1/1994
JP 2004208040 A * 7/2004
(Continued)

OTHER PUBLICATIONS

International Search Report and Written Opinion mailed on Feb. 22, 2021, received for PCT Application PCT/JP2021/002074, filed on Jan. 21, 2021, 10 pages including English Translation.

*Primary Examiner* — Dieu Hien T Duong
(74) *Attorney, Agent, or Firm* — XSENSUS LLP

(57) ABSTRACT

A ground plane is disposed on or in an inner layer of a dielectric substrate. Moreover, a feed line is disposed on or in the dielectric substrate. A first antenna element and a second antenna element are supported on the dielectric substrate. The first antenna element and the second antenna element include a first radiating element and a second radiating element connected to the feed line, respectively, and are disposed on a same side when seen from the ground plane. With a height of the ground plane being a reference, a top portion of the second antenna element is located higher than a top portion of the first antenna element. There is provided an antenna device of which the band can be expanded and of which the internal space of the casing can be effectively utilized.

20 Claims, 12 Drawing Sheets

(56) References Cited

U.S. PATENT DOCUMENTS

| | | | | |
|---|---|---|---|---|
| 2019/0157762 | A1* | 5/2019 | Shibata .................. | H01Q 5/307 |
| 2021/0091017 | A1* | 3/2021 | Yeon ....................... | H01L 24/16 |

FOREIGN PATENT DOCUMENTS

| | | | |
|---|---|---|---|
| JP | 5069093 | B2 | 11/2012 |
| JP | 2013-219533 | A | 10/2013 |
| JP | 2015-216520 | A | 12/2015 |
| JP | 2018-33078 | A | 3/2018 |

* cited by examiner

ANTENNA DEVICE AND COMMUNICATION DEVICE

CROSS-REFERENCE TO RELATED APPLICATIONS

The present application is a continuation application of International Patent Application No. PCT/JP2021/002074, filed Jan. 21, 2021, which claims priority to Japanese Patent Application No. 2020-014028, filed Jan. 30, 2020, the entire contents of each of which being incorporated herein by reference.

TECHNICAL FIELD

The present disclosure relates to an antenna device and a communication device having mounted thereon the antenna device.

BACKGROUND ART

An antenna device in which planar antennas and a substrate integrated waveguide are disposed on respective different layers of a multilayer substrate is disclosed in FIG. 2 of Patent Document 1 described below. In FIG. 2 of Patent Document 1, a ground plane is disposed on a layer just below the layer on which the plurality of planar antennas are each disposed.

CITATION LIST

Patent Document

Patent Document 1: Japanese Patent No. 5069093

SUMMARY

Technical Problems

Mobile terminals have become thinner and it is thus demanded to effectively utilize the internal space of the casings of the mobile terminals. Moreover, it is demanded to expand the bands of antennas. As recognized by the present inventors, in the antenna device described in Patent Document 1, since the distances from the ground conductor to the plurality of planar antennas are the same, it is difficult to achieve band expansion. It is an object of the present disclosure to provide an antenna device in which the band can be expanded and the internal space of the casing can be effectively utilized. It is another object of the present disclosure to provide a communication device having mounted thereon the antenna device.

Solutions to Problem

According to an one, non-limiting, aspect of the present disclosure, there is provided an antenna device including:

a dielectric substrate;

a ground plane disposed on or in an inner layer of the dielectric substrate;

a feed line disposed on or in the dielectric substrate; and a first antenna element and a second antenna element supported on the dielectric substrate, in which the first antenna element and the second antenna element include a first radiating element and a second radiating element connected to the feed line, respectively, and are disposed on a same side as viewed from the ground plane, with a height of the ground plane being a reference, a top portion of the second antenna element is located higher than a top portion of the first antenna element, the first antenna element and the second antenna element constitute an array antenna, the first feed element and the ground plane constitute a patch antenna, and the second feed element and the ground plane constitute a patch antenna.

According to another aspect of the present disclosure, there is provided a communication device including:

the above-described antenna device;

a casing configured to accommodate the antenna device; and a radio-frequency integrated circuit element accommodated in the casing and configured to supply a radio-frequency signal to the first radiating element and the second radiating element through the feed line, in which the first antenna element and the second antenna element face an inner surface of the casing, and with regard to a direction vertical to the ground plane, a distance from the ground plane to the inner surface of the casing through the second antenna element is longer than a distance from the ground plane to the inner surface of the casing through the first antenna element.

Advantageous Effects

With the height of the ground plane being a reference, the top portion of the second antenna element is located higher than the top portion of the first antenna element so that, as compared to a configuration in which a second antenna element is disposed at the same height as a first antenna element, band expansion can be achieved. Moreover, with the ground plane being a reference, the second antenna element is disposed at a relatively high position with respect to the inner surface of the casing so that the internal space of the casing can be effectively utilized.

DESCRIPTION OF EMBODIMENTS

First Embodiment

With reference to the drawings of FIG. 1A to FIG. 5B, an antenna device and a communication device according to a first embodiment are described.

Figure 1A:
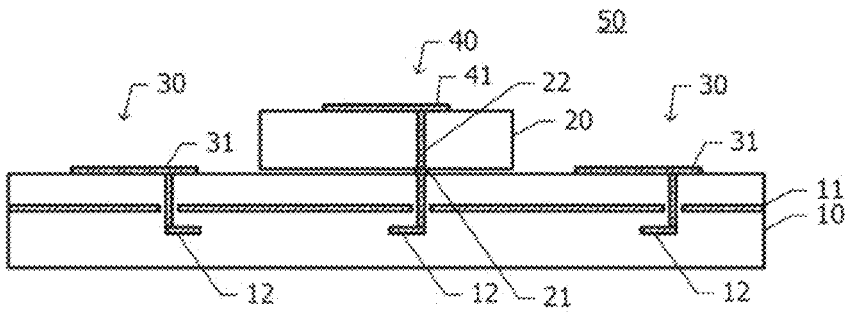
FIG. 1A is a sectional view of an antenna device according to a first embodiment.

FIG. 1A is a sectional view of an antenna device 50 according to the first embodiment. An additional member 20 is disposed on one of the surfaces (hereinafter referred to as an upper surface) of a dielectric substrate 10. The additional member 20 is fixed to the dielectric substrate 10 by an adhesive, for example. The additional member 20 is formed of the same dielectric material as the dielectric substrate 10. In plan view, the additional member 20 overlaps the partial region of the upper surface of the dielectric substrate 10. That is, the upper surface of the dielectric substrate 10 has a region in which the additional member 20 is not disposed. The additional member 20 has an upper surface in parallel with the upper surface of the dielectric substrate 10.

A pair of first antenna elements 30 is disposed on or in the dielectric substrate 10 so as to flank the additional member 20 in plan view. The first antenna elements 30 each include a first radiating element 31 including a metal film disposed on the upper surface of the dielectric substrate 10. It should be noted generally, that although the present embodiment shows the antenna elements 30 on the surface of the dielectric substrate 10, the antenna elements may also be disposed "in" the dielectric substrate 10. In this context "in" should be construed to be below a plane that defines of upper surface of the dielectric substrate 10, regardless of whether the antenna elements 30 are exposed on top or covered with a film. Also, while the term "radiating element(s)" is used herein, it should be understood that the elements may also receive RF energy. A second antenna element 40 is disposed on (or "in") the additional member 20. The second antenna element 40 includes a second radiating element 41 including a metal film disposed on the upper surface of the additional member 20.

A ground plane 11 is disposed on or in an inner layer of the dielectric substrate 10. Moreover, in the dielectric substrate 10, a plurality of feed lines 12 are disposed. The feed line 12 includes a microstrip line or a triplate strip line and a via conductor extending in the thickness direction of the dielectric substrate 10. The two first radiating elements 31 are connected to the respective feed lines 12. Radio-frequency signals are supplied to the first radiating elements 31 through the feed lines 12. Each of the two first radiating elements 31 and the ground plane 11 function as a patch antenna.

In the additional member 20, a feed line 22 including a via conductor connected to the second radiating element 41 is disposed. The feed line 22 is connected to the feed line 12 disposed on or in the dielectric substrate 10 with solder 21 interposed therebetween. A radio-frequency signal is supplied to the second radiating element 41 through the feed line 12, the solder 21, and the feed line 22. The second radiating element 41 and the ground plane 11 function collectively as a patch antenna.

The two first antenna elements 30 are directly supported on the dielectric substrate 10, and the second antenna element 40 is supported on the dielectric substrate 10 with the additional member 20 interposed therebetween. The first antenna elements 30 and the second antenna element 40 are disposed on the same side (the upper surface side of the dielectric substrate 10) when seen from the ground plane 11. With the height of the ground plane 11 being a reference, the top portion of the second antenna element 40 is located higher than the top portions of the first antenna elements 30. That is, the second radiating element 41 is disposed higher than the first radiating elements 31. Thus, the interval from the ground plane 11 to the second radiating element 41 is wider than the interval from the ground plane 11 to the first radiating element 31.

Figure 1B:
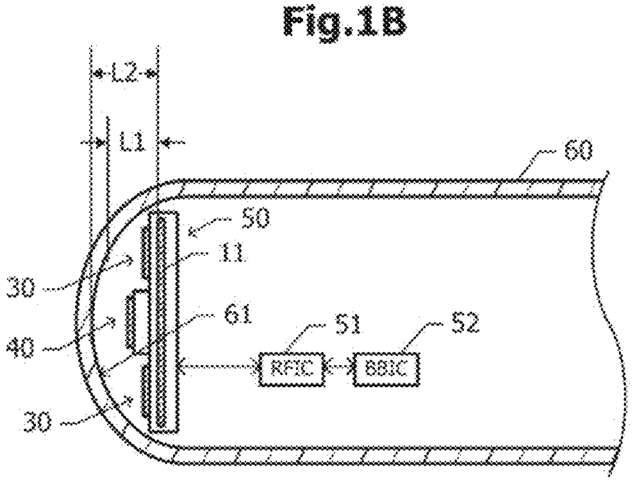
FIG. 1B is a sectional view of a portion of a communication device according to the first embodiment.

FIG. 1B is a sectional view of a portion of a communication device according to the first embodiment. In a casing 60, the antenna device 50 illustrated in FIG. 1A, a radio-frequency integrated circuit element (RFIC) 51, and a baseband integrated circuit element (BBIC) 52 are accommodated. The inner surface of the casing 60 includes, in part, a cylindrical surface 61 curved to protrude outward with respect to the casing 60. In the casing 60, the antenna device 50 is supported in a posture that makes the first antenna elements 30 and the second antenna element 40 face the cylindrical surface 61 and the ground plane 11 be in parallel with the generatrix of the cylindrical surface 61. Moreover, in the casing 60, the antenna device 50 is supported in the posture that makes, in the plan view of the dielectric substrate 10, the direction in which the two first antenna elements 30 and the single second antenna element 40 are arranged be orthogonal to the generatrix of the cylindrical surface 61. A distance L2 from the ground plane 11 to the cylindrical surface 61 through the second antenna element 40 is longer than a distance L1 from the ground plane 11 to the cylindrical surface 61 through the first antenna element 30.

The BBIC 52 performs baseband signal processing. A baseband signal or an intermediate-frequency signal is input from the BBIC 52 to the RFIC 51. The RFIC 51 up-converts a baseband signal or an intermediate-frequency signal to RF and then supplies the radio-frequency signal to the first radiating elements 31 and the second radiating element 41 through the feed lines 12 or the feed line 22 (FIG. 1A), for example. The RFIC 51 also down-converts radio-frequency signals received by the first radiating elements 31 and the second radiating element 41. The down-converted signals are input to the BBIC 52.

Next, the excellent effects of the first embodiment are described.

In the first embodiment, the second radiating element 41 is disposed higher than the upper surface of the dielectric substrate 10 when seen from the ground plane 11. That is, the interval from the ground plane 11 to the second radiating element 41 is wider than the interval from the ground plane 11 to the upper surface of the dielectric substrate 10. Thus, as compared to a configuration in which the second radiating element 41 and the first radiating elements 31 are disposed at the same height, the operating bandwidth of the second antenna element 40 can be extended.

Further, the distance L2 from the ground plane 11 to the cylindrical surface 61 through the second antenna element 40 is longer than the distance L1 from the ground plane 11 to the cylindrical surface 61 through the first antenna element 30. Even when the second radiating element 41 is disposed on the upper surface of the dielectric substrate 10, it is difficult to use the space between the second antenna element 40 and the cylindrical surface 61 for other purposes. Since it is difficult to use the space occupied by the additional member 20 and the second antenna element 40 for other purposes, even when the additional member 20 and the second antenna element 40 are disposed in the casing 60, the space for accommodating other components is not narrowed. In this way, the band of the antenna device 50 can be expanded without the excessive occupation of the internal space of the casing 60.

Next, with reference to the drawings of FIG. 2A to FIG. 5B, simulations performed for confirming the excellent effects of the first embodiment and the results thereof are described.

Figure 2A:
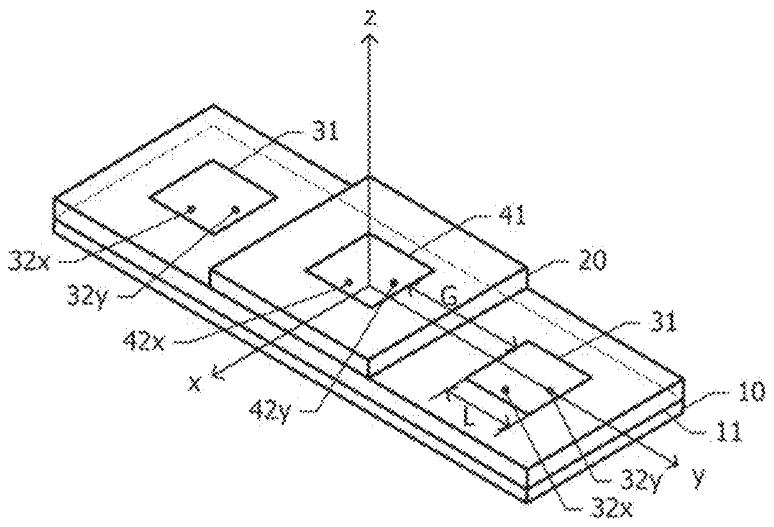
FIG. 2A is a perspective view of a simulation model having the structure of the antenna device according to the first embodiment.
Figure 2B:
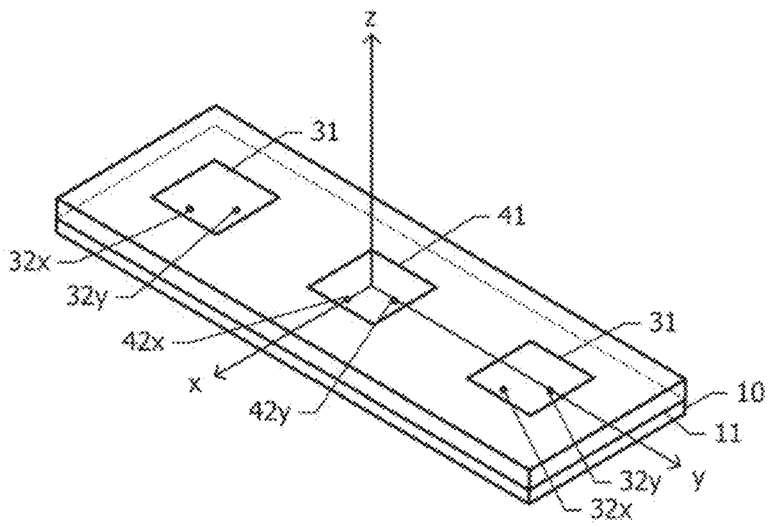
FIG. 2B is a perspective view of a simulation model according to a comparative example.

FIG. 2A is a perspective view of a simulation model having the structure of the antenna device 50 according to the first embodiment, and FIG. 2B is a perspective view of a simulation model according to a comparative example. The components of the simulation model illustrated in FIG. 2A are denoted by reference characters that are the same as the reference characters of the corresponding components of the antenna device 50 according to the first embodiment (FIG. 1A).

The first radiating elements 31 and the second radiating element 41 each have a square shape in plan view. The centers of one of the first radiating elements 31, the second radiating element 41, and the other of the first radiating elements 31 are located on a single straight line in this order in plan view. An xyz rectangular coordinate system in which the direction of the straight line is the y-axis direction and the normal direction of the upper surface of the dielectric substrate 10 is the z-axis direction is defined. The edges of the first radiating elements 31 and the second radiating element 41 are in parallel with the x-axis direction or the y-axis direction.

A length L of the side of each of the first radiating elements 31 and the second radiating element 41 was 1.9 mm and an interval G between the first radiating element 31 and the second radiating element 41 in the y-axis direction was 5 mm. The interval from the ground plane 11 to the first radiating element 31 was 0.172 mm and the interval from the ground plane 11 to the second radiating element 41 was 0.39 mm. Feed points 32*y* and 42*y* are located in the slightly inner side portions of the middle points on the edges on the positive side in the y axis of the first radiating elements 31 and the second radiating element 41, respectively. Feed points 32*x* and 42*x* are located in the slightly inner side portions of the middle points on the edges on the positive side in the x axis of the first radiating elements 31 and the second radiating element 41, respectively.

In the comparative example illustrated in FIG. 2B, the additional member 20 is not disposed, and hence the interval from the ground plane 11 to the second radiating element 41 is the same as the interval from the ground plane 11 to the first radiating element 31.

Figure 3A:
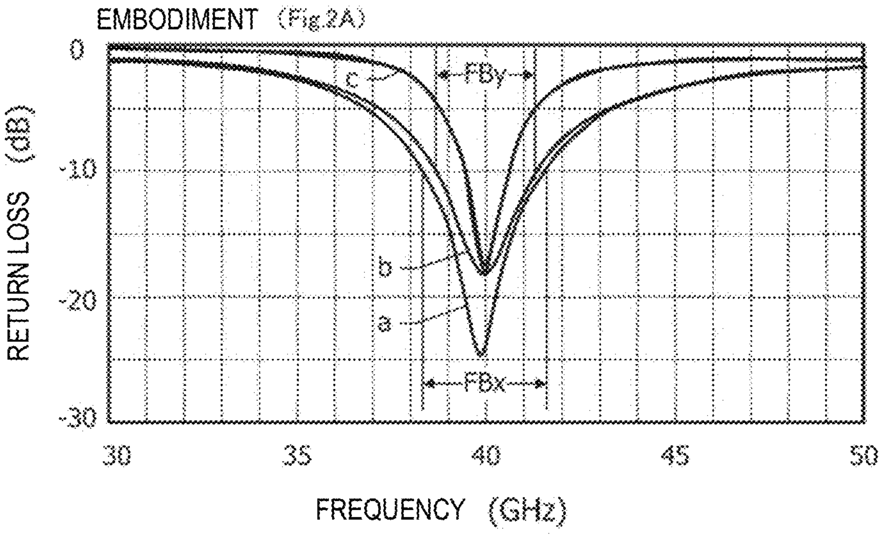
FIG. 3A is a graph illustrating the frequency characteristics of return loss when power is supplied to a second radiating element of the simulation model illustrated in FIG. 2A.
Figure 3B:
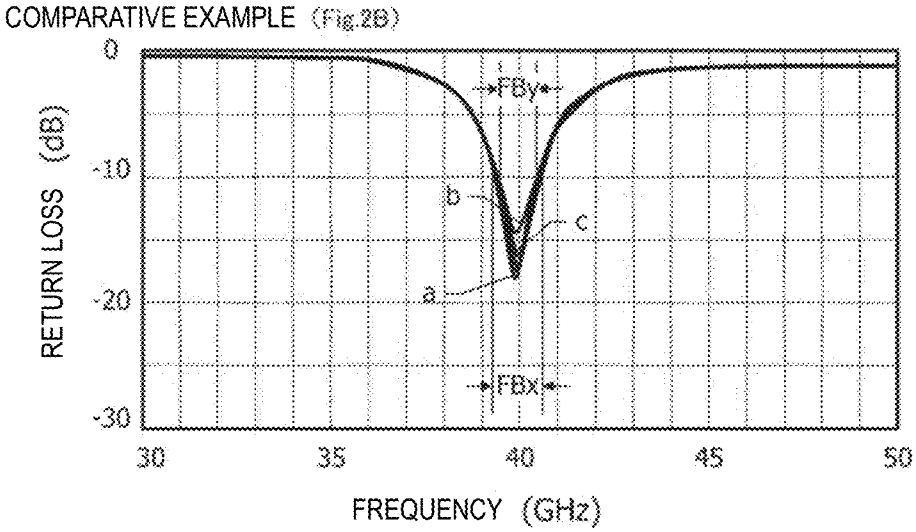
FIG. 3B is a graph illustrating the frequency characteristics of return loss when power is supplied to a second radiating element of the simulation model illustrated in FIG. 2B.

FIG. 3A is a graph illustrating the frequency characteristics of return loss when power is supplied to the second radiating element 41 of the simulation model illustrated in FIG. 2A, and FIG. 3B is a graph illustrating the frequency characteristics of return loss when power is supplied to the second radiating element 41 of the simulation model illustrated in FIG. 2B. The horizontal axis indicates frequency in units of "GHz" and the vertical axis indicates return loss in units of "dB". Curves a and b illustrated in FIG. 3A and FIG. 3B indicate the return loss of the second radiating element 41 when power is supplied to the feed points 42*x* and 42*y*, respectively. The lines of return loss when power is supplied to the feed points 32*x* and 32*y* of each of the two first radiating elements 31 substantially overlap each other as indicated by a curve c.

The range with a return loss of −10 dB or less (i.e., more negative on a decibel scale such as −20 dB) is defined as the operating frequency band and the respective operating frequency bandwidths of the second radiating element 41 when power is supplied to the feed points 42*x* and 42*y* are denoted by FBx and FBy. The operating frequency bandwidths FBx and FBy of the simulation model according to the first embodiment are wider than the operating frequency bandwidths FBx and FBy of the simulation model according to the comparative example, respectively. From this simulation result, it has been confirmed that band expansion can be achieved by employing the structure according to the first embodiment. Note that, in the simulation, power is supplied to the first radiating elements 31 and the second radiating element 41 individually, but also in a case where power is supplied to the two first radiating elements 31 and the single second radiating element 41 at the same time to make the first radiating elements 31 and the second radiating element 41 operate as an array antenna, band expansion can be achieved by employing the configuration according to the first embodiment.

Figure 4A:
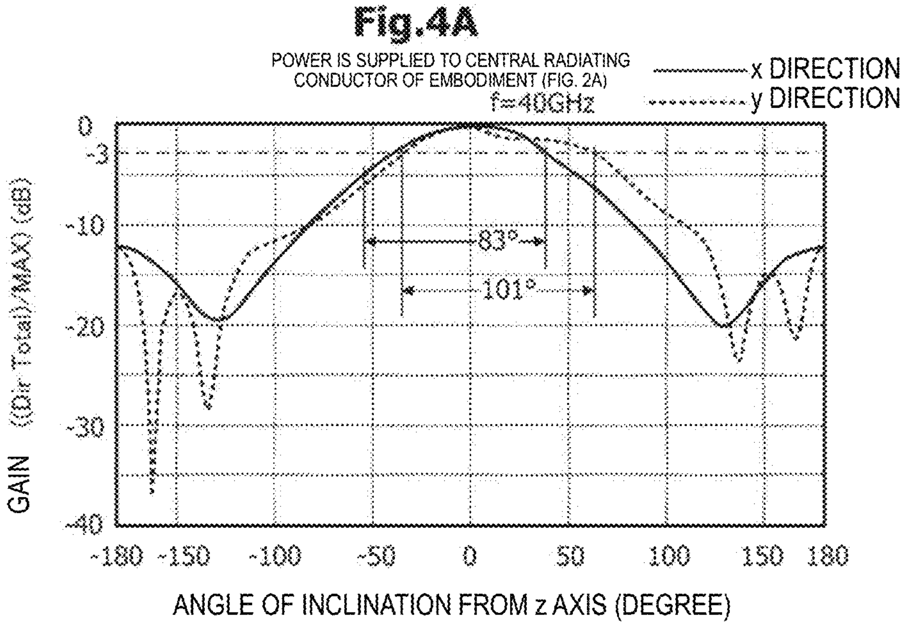
FIG. 4A is a graph illustrating directivity characteristics when a 40-GHz radio-frequency signal is supplied to the second radiating element of the simulation model illustrated in FIG. 2A.
Figure 4B:
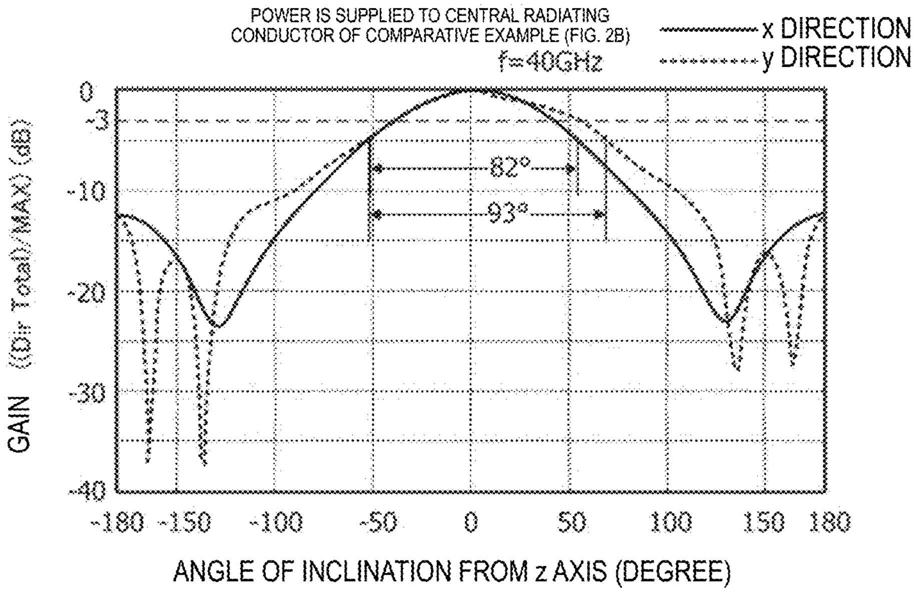
FIG. 4B is a graph illustrating directivity characteristics when a 40-GHz radio-frequency signal is supplied to the second radiating element of the simulation model illustrated in FIG. 2B.

FIG. 4A is a graph illustrating directivity characteristics when a 40-GHz radio-frequency signal is supplied to the second radiating element 41 of the simulation model illustrated in FIG. 2A, and FIG. 4B is a graph illustrating directivity characteristics when a 40-GHz radio-frequency signal is supplied to the second radiating element 41 of the simulation model illustrated in FIG. 2B. The horizontal axis indicates angle of inclination from the z axis in units of "degree" and the vertical axis indicates antenna gain relative to 0-dB maximum gain in units of "dB (Dir Total/Max)". In the graphs of FIG. 4A and FIG. 4B, the solid line and the dashed line indicate directivity characteristics on the xz plane and the yz plane, respectively.

In the simulation model according to the embodiment (FIG. 2A), as illustrated in FIG. 4A, the 3-dB beam widths in the x direction and the y direction are approximately 83° and approximately 101°, respectively. In contrast to this, in the simulation model according to the comparative example (FIG. 2B), as illustrated in FIG. 4B, the 3-dB beam widths in the x direction and the y direction are approximately 82° and approximately 93°, respectively.

Figure 5A:
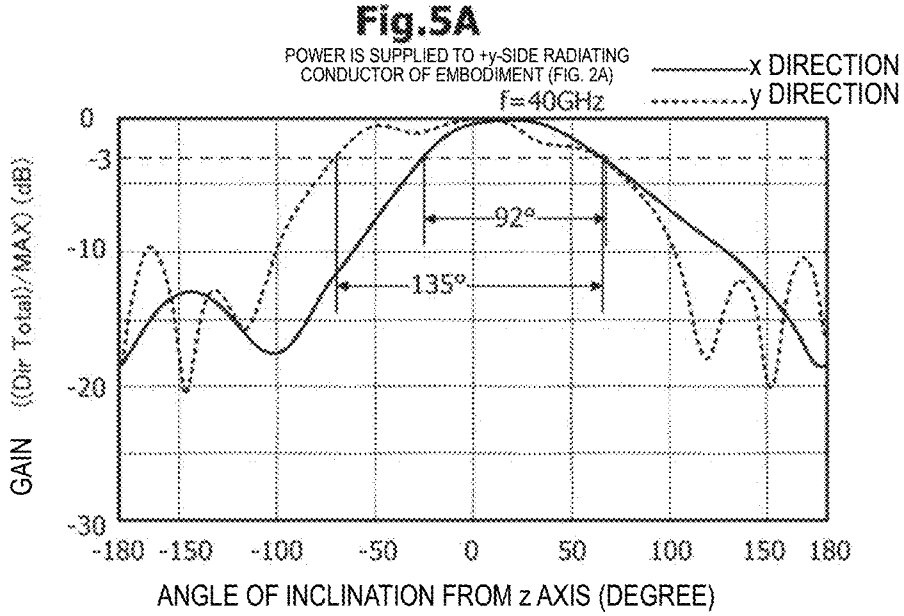
FIG. 5A is a graph illustrating directivity characteristics when a 40-GHz radio-frequency (RF) signal is supplied to a first radiating element on the positive side in the y axis of the simulation model illustrated in FIG. 2A.
Figure 5B:
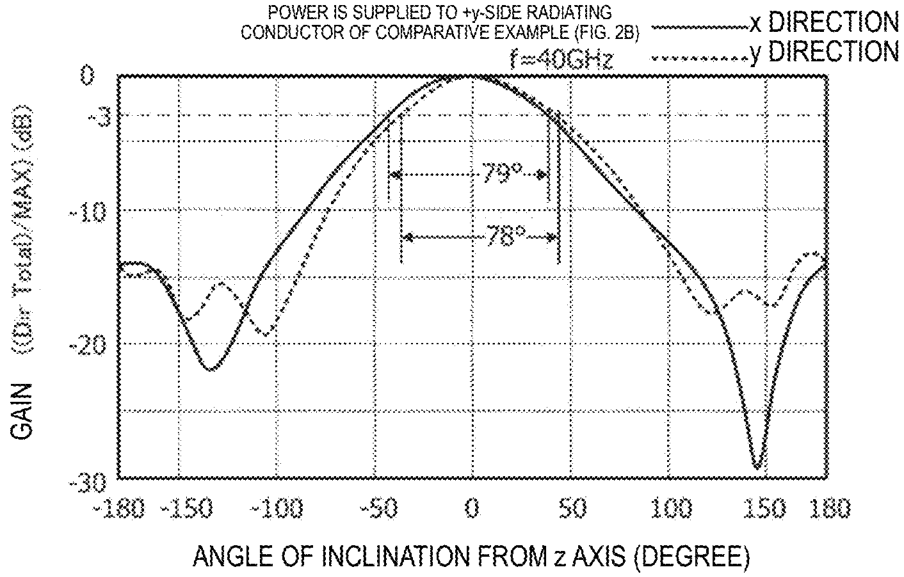
FIG. 5B is a graph illustrating directivity characteristics when a 40-GHz radio-frequency signal is supplied to a first radiating element on the positive side in the y axis of the simulation model illustrated in FIG. 2B.

FIG. 5A is a graph illustrating directivity characteristics when a 40-GHz radio-frequency signal is supplied to the first radiating element 31 on the positive side in the y axis of the simulation model illustrated in FIG. 2A, and FIG. 5B is a graph illustrating directivity characteristics when a 40-GHz radio-frequency signal is supplied to the first radiating element 31 on the positive side in the y axis of the simulation model illustrated in FIG. 2B. The horizontal axis indicates angle of inclination from the z axis in units of "degree" and the vertical axis indicates antenna gain relative to 0-dB maximum gain in units of "dB (Dir Total/Max)". In the graphs of FIG. 5A and FIG. 5B, the solid line and the dashed line indicate directivity characteristics on the xz plane and the yz plane, respectively.

In the simulation model according to the embodiment (FIG. 2A), as illustrated in FIG. 5A, the 3-dB beam widths in the x direction and the y direction are approximately 92° and approximately 135°, respectively. In contrast to this, in the simulation model according to the comparative example (FIG. 2B), as illustrated in FIG. 5B, the 3-dB beam widths in the x direction and the y direction are approximately 79° and approximately 78°, respectively.

From the simulation results illustrated in the drawings of FIG. 4A to FIG. 5B, it has been confirmed that the coverage area is extended by employing the configuration of the antenna device 50 according to the first embodiment. In the simulations described above, the directivity characteristics when power is supplied to one of the two first radiating elements 31 and the single second radiating element 41 are described, but also in a case where power is supplied to the two first radiating elements 31 and the single second radiating element 41 at the same time to make the first radiating elements 31 and the second radiating element 41 operate as an array antenna, the coverage area can be extended.

Next, modifications of the first embodiment are described.

In the first embodiment, the RFIC 51 (FIG. 1B) is accommodated in the casing 60, but a specific location where the RFIC 51 is accommodated is not mentioned. The RFIC 51 is preferably mounted on the back surface of the dielectric substrate 10 (FIG. 1B). Here, the back surface means the opposite surface of the side on which the first antenna elements 30 and the second antenna element 40 are supported when seen from the ground plane 11. The RFIC 51 is connected to the feed lines 12 (FIG. 1A) disposed on or in the inner layer of the dielectric substrate 10. It is preferred that a connector is mounted on the back surface of the dielectric substrate 10 and the connector and the RFIC 51 are connected to each other by a coaxial cable.

Figure 6A:
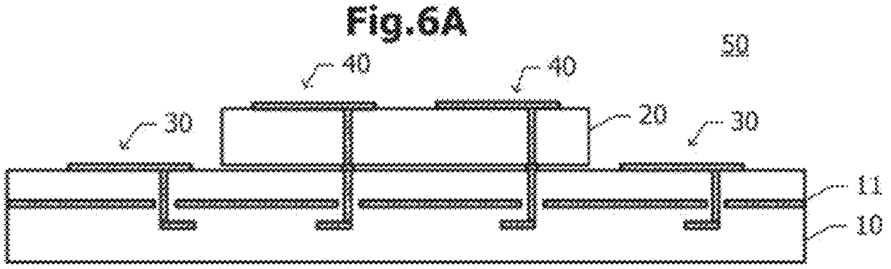
FIG. 6A is a sectional view of an antenna device according to a modification of the first embodiment.
Figure 6B:
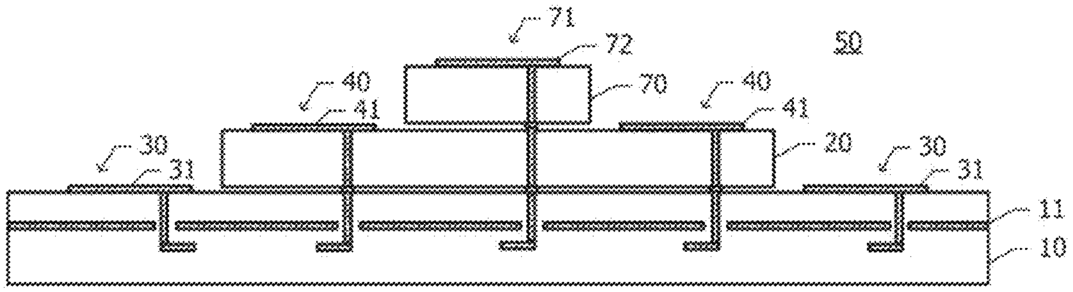
FIG. 6B is a sectional view of an antenna device according to another modification of the first embodiment.
Figure 6C:
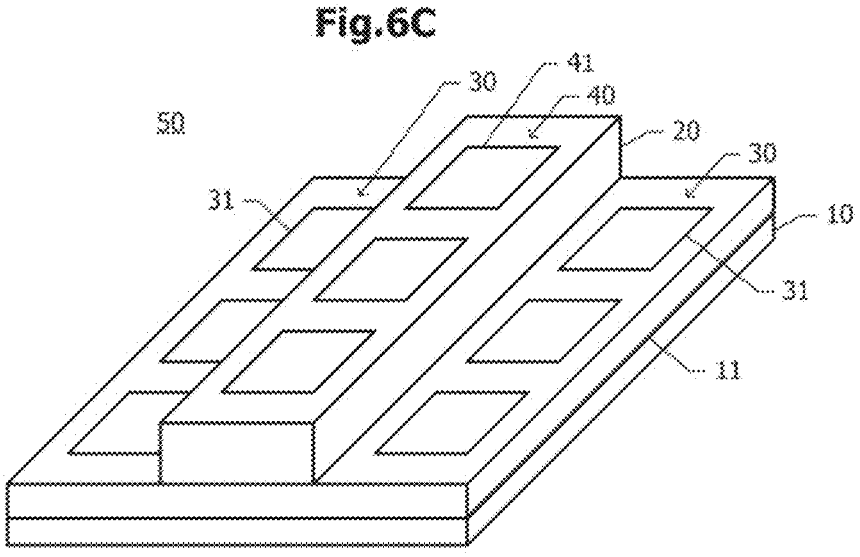
FIG. 6C is a perspective view of an antenna device according to still another modification of the first embodiment.

Next, with reference to the drawings of FIG. 6A to FIG. 6C, an antenna device according to one of the other modifications of the first embodiment is described.

FIG. 6A is a sectional view of the antenna device 50 according to the modification of the first embodiment. In the first embodiment, the single second antenna element 40 (FIG. 1A) is disposed, but in the present modification, the two second antenna elements 40 are disposed. The two second antenna elements 40 are supported on the common additional member 20. The two first antenna elements 30 and the two second antenna elements 40 are disposed on a single straight line in plan view. Note that the three or more first antenna elements 30 and the three or more second antenna elements 40 may be disposed.

FIG. 6B is a sectional view of the antenna device 50 according to another modification of the first embodiment. In the present modification, another additional member 70 is further disposed on the additional member 20. A third antenna element 71 is supported on the additional member 70. The third antenna element 71 includes a third radiating element 72 disposed on the upper surface of the additional member 70. In this way, in the present modification, the antenna device 50 has the three-step configuration. Note that the antenna device 50 may have a stepped configuration with four or more steps.

FIG. 6C is a perspective view of the antenna device 50 according to still another modification of the first embodiment. In the first embodiment, the two first antenna elements 30 and the single second antenna element 40 are disposed on a single straight line in plan view. In contrast to this, in the present modification, the plurality of first antenna elements 30 and the plurality of second antenna elements 40 are disposed two-dimensionally, for example, in a matrix. For example, the plurality of second antenna elements 40 form a single line and the plurality of first antenna elements 30 form a line on each side of the line.

In all the modifications, with the ground plane 11 being a reference, the second radiating elements 41 are disposed higher than the first radiating elements 31. In the modification illustrated in FIG. 6B, the third radiating element 72 is further disposed higher than the second radiating elements 41. Thus, also in those modifications, as in the case of the first embodiment, band expansion can be achieved. Which modification of the antenna device is employed is preferably selected depending on required antenna characteristics and the shape of the inner surface of a casing for accommodating the antenna device.

In the first embodiment, the surface of the casing 60 that the antenna device 50 faces is the cylindrical surface 61 (FIG. 1B), but the inner surface of the casing 60 may be a surface other than a cylindrical surface. For example, a curved surface curved outward or a stepped surface along the curved surface may be used.

Second Embodiment

Figure 7:
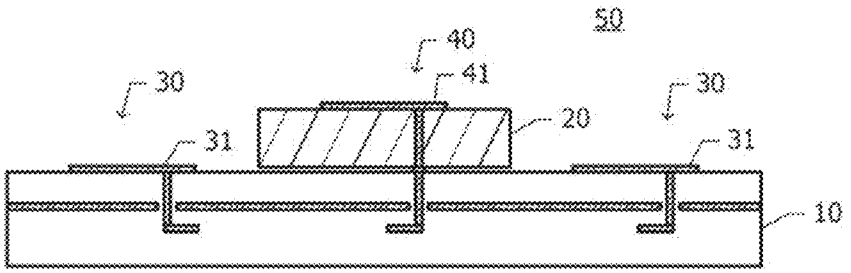
FIG. 7 is a sectional view of an antenna device according to a second embodiment.

Next, with reference to FIG. 7, an antenna device according to a second embodiment is described. In the following, the description of components common to the antenna device according to the first embodiment (FIG. 1A) is omitted.

FIG. 7 is a sectional view of the antenna device 50 according to the second embodiment. In the first embodiment (FIG. 1A), the additional member 20 and the dielectric substrate 10 are formed of the same dielectric material. In contrast to this, in the second embodiment, the additional member 20 and the dielectric substrate 10 are formed of materials different from each other in permittivity. The permittivity of the additional member 20 is lower than the permittivity of the dielectric substrate 10. For example, the additional member 20 and the dielectric substrate 10 are formed of glass epoxy resin, and the glass content of the additional member 20 is less than the glass content of the dielectric substrate 10.

Next, the excellent effects of the second embodiment are described.

With the low permittivity of the additional member 20, the wavelength shortening effect is reduced and the dimensions of the second radiating element 41 under the same resonant frequency conditions are thus increased. As a result, the antenna gain is increased. Moreover, with the large dimensions of the second radiating element 41, the Q of the resonator drops, with the result that there is an effect that the operating frequency band is expanded.

Third Embodiment

Figure 8:
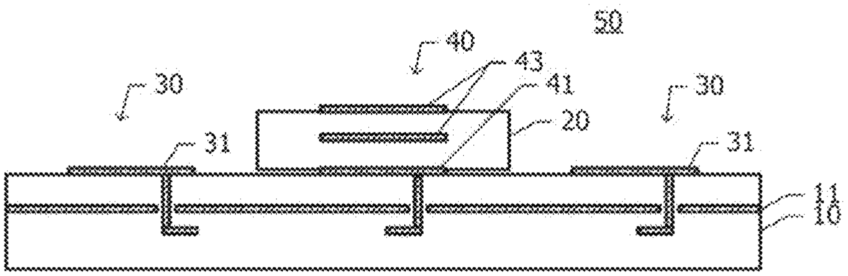
FIG. 8 is a sectional view of an antenna device according to a third embodiment.

Next, with reference to FIG. 8, an antenna device according to a third embodiment is described. In the following, the description of components common to the antenna device according to the first embodiment (FIG. 1A) is omitted.

FIG. 8 is a sectional view of the antenna device 50 according to the third embodiment. In the first embodiment, the second antenna element 40 includes the second radiating element 41 disposed on the upper surface of the additional member 20. In contrast to this, in the third embodiment, the second antenna element 40 includes the second radiating element 41 and at least one parasitic element 43. The second radiating element 41 is disposed on the upper surface of the dielectric substrate 10. The parasitic element 43 is disposed on the upper surface or inner layer of the additional member 20. The parasitic element 43 is electromagnetically coupled to the second radiating element 41, and the second radiating element 41, the parasitic element 43, and the ground plane 11 operate as a stacked patch antenna.

In the third embodiment, with the height of the ground plane 11 being a reference, the first radiating elements 31 and the second radiating element 41 are disposed at the same position in terms of the height direction. However, as in the case of the first embodiment, the top portion of the second antenna element 40, that is, the upper surface of the parasitic element 43 disposed on the upper surface of the additional member 20 is located higher than the top portions of the first antenna elements 30.

Next, the excellent effects of the third embodiment are described. In the third embodiment, since the parasitic element 43 is provided above the second radiating element 41, band expansion can be achieved. Moreover, the coverage area can be extended.

Fourth Embodiment

Figure 9:
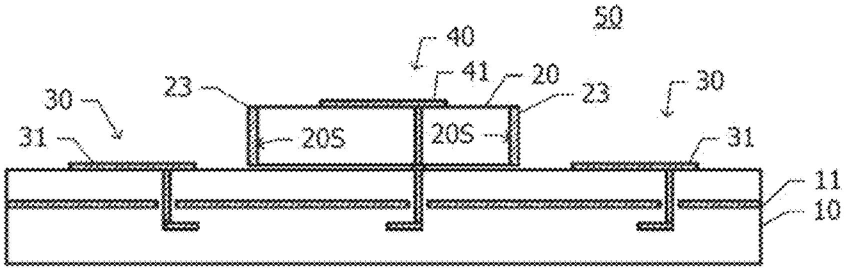
FIG. 9 is a sectional view of an antenna device according to a fourth embodiment.

Next, with reference to FIG. 9, an antenna device according to a fourth embodiment is described. In the following, the description of components common to the antenna device according to the first embodiment (FIG. 1A) is omitted.

FIG. 9 is a sectional view of the antenna device 50 according to the fourth embodiment. In plan view, a riser surface 20S being the side surface of the additional member 20 is located between the first antenna element 30 and the second antenna element 40. With the riser surface 20S being a boundary, the region in which the second antenna element 40 is disposed is higher than the region in which the first antenna element 30 is disposed. The riser surface 20S has attached thereto a reflective member 23 made of metal such as copper.

Next, the excellent effects of the fourth embodiment are described.

A radio wave radiated from the first radiating element 31 is partially reflected by the reflective member 23. With this, the coverage area can be extended in a direction that the reflective member 23 faces.

Next, a modification of the fourth embodiment is described.

In the fourth embodiment, the metal is used for the reflective member 23, but the reflective member 23 may be formed of another material that reflects radio waves in the operating frequency band of the antenna device 50.

Fifth Embodiment

Figure 10A:
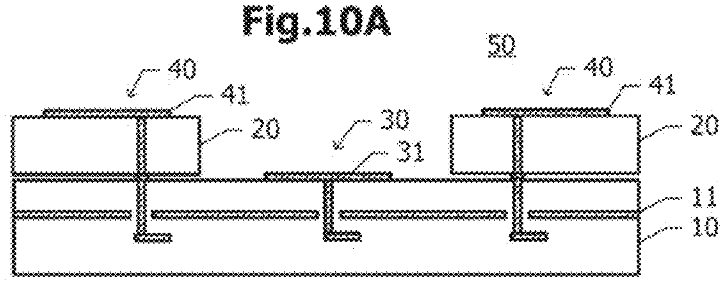
FIG. 10A is a sectional view of an antenna device 50 according to a fifth embodiment.

Next, with reference to FIG. 10A, an antenna device according to a fifth embodiment is described. In the following, the description of components common to the antenna device according to the first embodiment (FIG. 1A) is omitted.

FIG. 10A is a sectional view of the antenna device 50 according to the fifth embodiment. In the first embodiment (FIG. 1A), the additional member 20 is disposed in the central portion of the upper surface of the dielectric substrate 10. In contrast to this, in the fifth embodiment, the two additional members 20 are disposed near the respective ends of the upper surface of the dielectric substrate 10. The first radiating element 31 forming the first antenna element 30 is disposed in the region between the two additional members 20 of the upper surface of the dielectric substrate 10. The second radiating elements 41 forming the second antenna elements 40 are disposed on or in the two respective additional members 20.

Next, the excellent effects of the fifth embodiment are described.

Also in the antenna device according to the fifth embodiment, as in the first embodiment, with the height of the ground plane 11 being a reference, the second radiating elements 41 are disposed higher than the upper surface of the dielectric substrate 10. Thus, as compared to a case where all radiating elements are disposed on the upper surface of the dielectric substrate 10, the operating bandwidth can be extended. Further, in a case where a protrusion is formed on the inner surface of a casing, the antenna device can be disposed with the first radiating element 31 facing the protrusion so that the second radiating elements 41 can be located near the region around the protrusion on the inner surface of the casing. With this, the internal space of the casing can be effectively utilized. Moreover, in the fifth embodiment, the wall surface made of the dielectric material is located on each side of the first radiating element 31 at the center. Due to the effect of the wall surfaces, there is an effect that the directivity is sharpened.

Figure 10B:
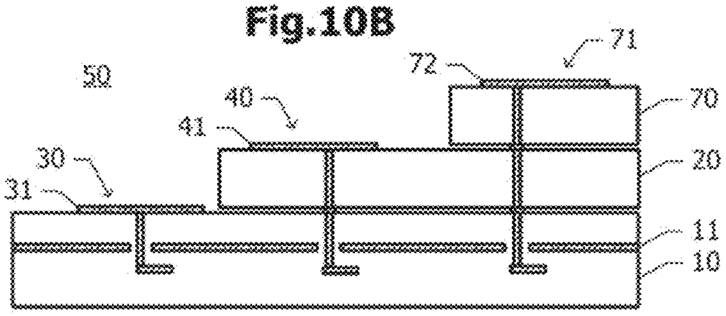
FIG. 10B, FIG. 10C, and FIG. 10D are each a sectional view of an antenna device according to one of modifications of the fifth embodiment.
Figure 10C:
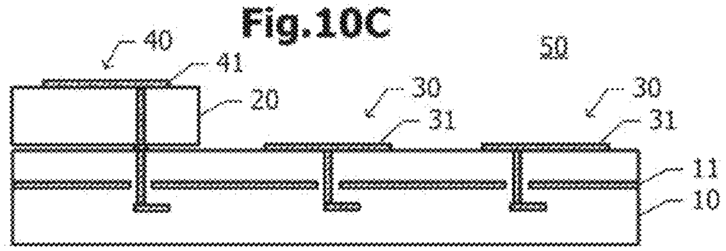
Figure 10D:
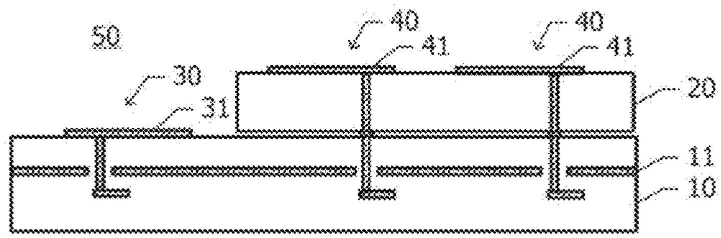

Next, with reference to FIG. 10B, FIG. 10C, and FIG. 10D, an antenna device according to one of modifications of the fifth embodiment is described. In the first embodiment (FIG. 1A), the modifications of the first embodiment (FIG. 6A and FIG. 6B), and the fifth embodiment (FIG. 10A), the heights of the plurality of radiating elements are distributed symmetrically with respect to the center of the array direction of the radiating elements. In contrast to this, in the modifications of the fifth embodiment described below, the heights of the plurality of radiating elements are distributed asymmetrically. FIG. 10B, FIG. 10C, and FIG. 10D are each a sectional view of the antenna device according to one of modifications of the fifth embodiment.

In the modification illustrated in FIG. 10B, the additional member 20 serving as the first layer is disposed in the partial region of the upper surface of the dielectric substrate 10 and the additional member 70 serving as the second layer is disposed in the partial region of the upper surface of the additional member 20. The additional members 20 and 70 are disposed on one side (right side in FIG. 10B) of the upper surface of the dielectric substrate 10 in a biased manner. The dielectric substrate 10 and the two additional members 20 and 70 form a stepped upper surface with three steps (corresponding to stair treads).

On the three respective upper surfaces different from each other in height, the first radiating element 31 forming the first antenna element 30, the second radiating element 41 forming the second antenna element 40, and the third radiating element 72 forming the third antenna element 71 are disposed. In plan view, the first radiating element 31, the second radiating element 41, and the third radiating element

72 are disposed on a line. In the present modification, due to the effect of the wall surface, which is made of the dielectric material, located on one side of each of the first radiating element 31 and the second radiating element 41, the direction of the main beam can be inclined with respect to the normal direction of the upper surface of the dielectric substrate 10.

In the modification illustrated in FIG. 10C, in plan view, the plurality of first radiating elements 31 and the single second radiating element 41 are disposed on a line and the second radiating element 41 is disposed at the end portion of the line. That is, with the height of the ground plane 11 being a reference, of the plurality of radiating elements arranged on a line, the second radiating element 41 at the end portion is located higher than the first radiating elements 31. In the present modification, due to the effect of the wall surface, which is made of the dielectric material, located on one side of the first radiating element 31 at the center, the direction of the main beam of the first radiating element 31 at the center is inclined with respect to the upper surface of the dielectric substrate 10. The directions of the main beams of the other first radiating element 31 and the second radiating element 41 are substantially vertical to the upper surface of the dielectric substrate 10. Thus, there is an effect that the directivity of the antenna device 50 is widened.

In the modification illustrated in FIG. 10D, in plan view, the plurality of second radiating elements 41 and the single first radiating element 31 are disposed on a line and the first radiating element 31 is disposed at the end portion of the line. That is, with the height of the ground plane 11 being a reference, of the plurality of radiating elements arranged on a line, the first radiating element 31 at the end portion is located lower than the second radiating elements 41. Also in the present modification, as in the modification illustrated in FIG. 10C, there is an effect that the directivity of the antenna device 50 is widened.

In the first embodiment illustrated in FIG. 1B, the inner surface of the side surface portion of the casing 60 is curved outward and the shape of the inner surface is substantially symmetrical with respect to the thickness direction of the internal space of the casing 60. In contrast to this, in a case where the inner surface of a casing is curved asymmetrically with respect to the thickness direction of the internal space, an antenna device in which the heights of a plurality of radiating elements are distributed asymmetrically like the modifications illustrated in FIG. 10B, FIG. 10C, and FIG. 10D may be used depending on the shape of the inner surface of the casing. Which modification of the antenna device is used may be selected depending on the shape of the inner surface of a casing. Also in the antenna device according to one of those modifications, the operating bandwidth can be extended as in the fifth embodiment.

Sixth Embodiment

Figure 11:
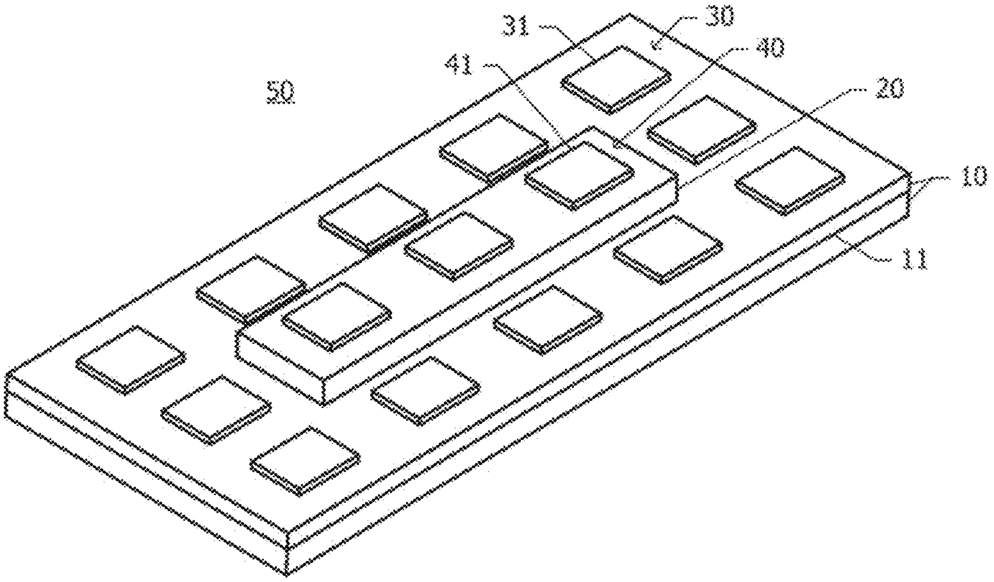
FIG. 11 is a perspective view of an antenna device according to a sixth embodiment.
Figure 12:
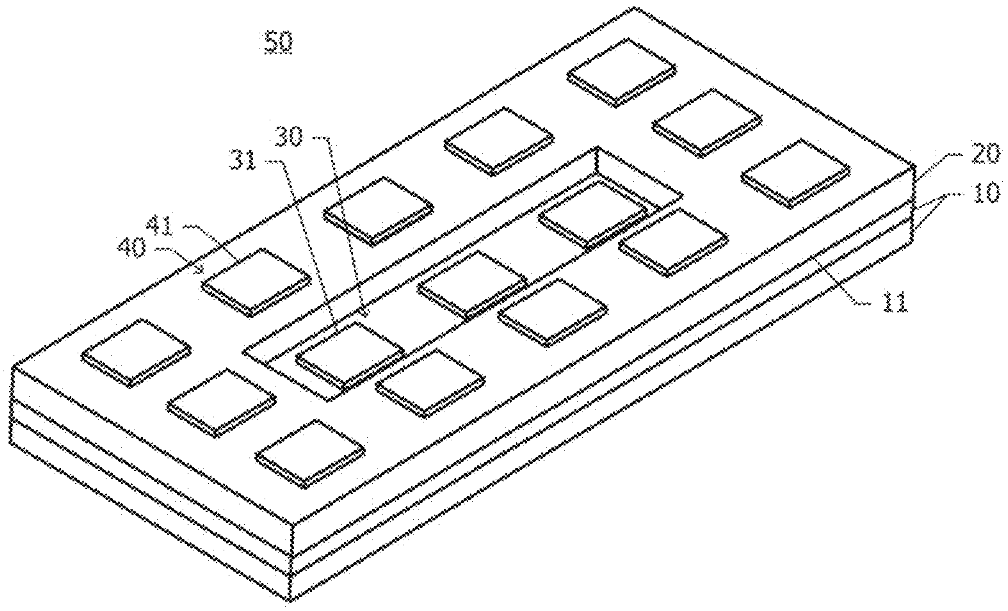
FIG. 12 is a perspective view of an antenna device according to a modification of the sixth embodiment.
Figure 13:
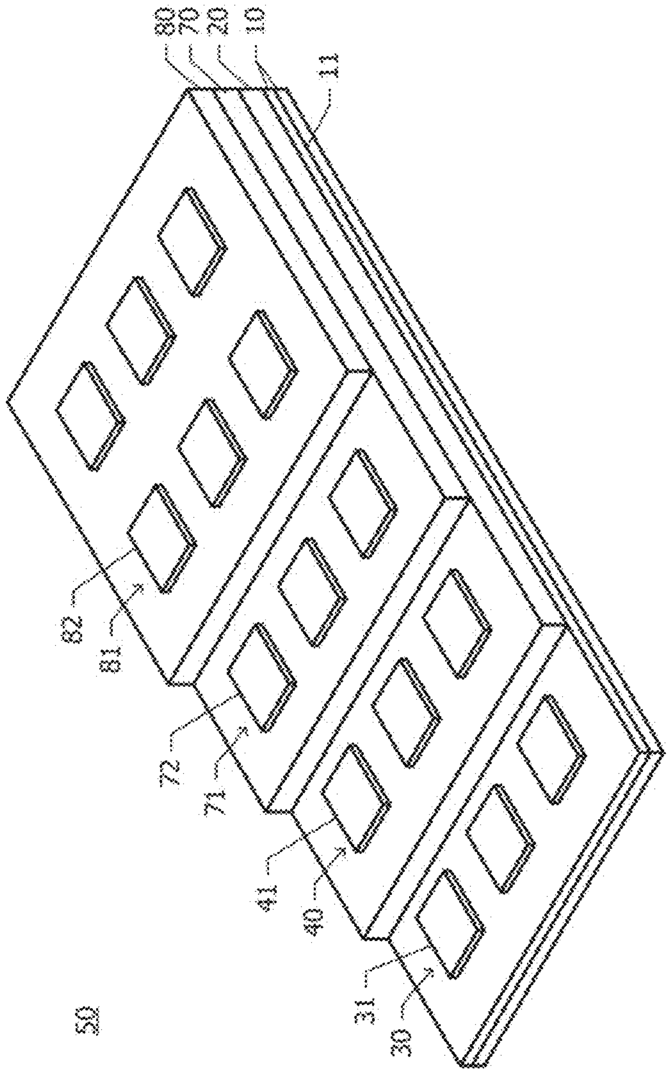
FIG. 13 is a perspective view of an antenna device according to another modification of the sixth embodiment.
Figure 14:
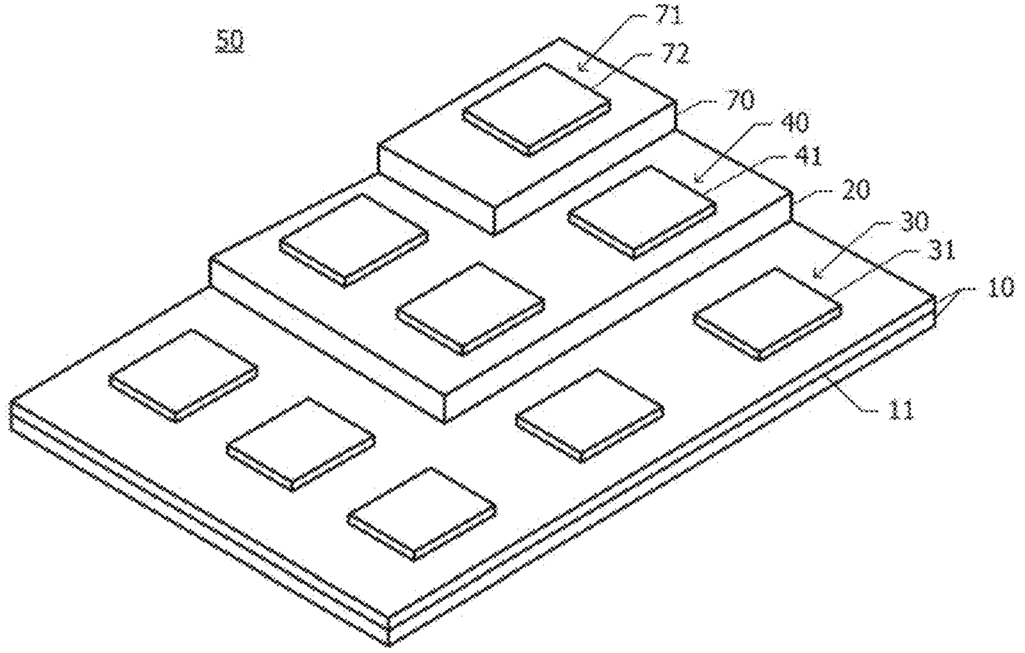
FIG. 14 is a perspective view of an antenna device according to still another modification of the sixth embodiment.

Next, with reference to the drawings of FIG. 11 to FIG. 14, an antenna device according to one of a sixth embodiment and modifications thereof is described. In the following, the description of components common to the antenna device according to the first embodiment (FIG. 1A) is omitted. FIG. 11 is a perspective view of the antenna device 50 according to the sixth embodiment, and FIG. 12, FIG. 13, and FIG. 14 are each a perspective view of the antenna device 50 according to one of the modifications of the sixth embodiment. In the sixth embodiment and the modifications thereof, the plurality of radiating elements are two-dimensionally disposed.

In the antenna device 50 according to the sixth embodiment (FIG. 11), the additional member 20 is disposed in the innermost portion away from the edges of the upper surface of the dielectric substrate 10. The plurality of (for example, three) second radiating elements 41 are disposed on the upper surface of the additional member 20. In the region on the inner side of the edges of the dielectric substrate 10 and on the outer side of the edges of the additional member 20, the plurality of (for example, 12) first radiating elements 31 are disposed to surround the additional member 20 in plan view. That is, in plan view, the radiating elements in the innermost portion of the upper surface of the dielectric substrate 10 are located higher than the radiating elements in the peripheral region.

In the antenna device 50 according to the modification illustrated in FIG. 12, the annular additional member 20 is disposed along the edges of the upper surface of the dielectric substrate 10. The additional member 20 is not disposed in the innermost portion of the upper surface of the dielectric substrate 10. The plurality of second radiating elements 41 are disposed on the upper surface of the additional member 20. The plurality of first radiating elements 31 are disposed in the region surrounded by the annular additional member 20 of the upper surface of the dielectric substrate 10. That is, in plan view, the radiating elements in the peripheral region of the upper surface of the dielectric substrate 10 are located higher than the radiating elements in the innermost portion.

In the antenna device 50 according to the modification illustrated in FIG. 13, in plan view, the additional member 20 serving as the first layer is disposed in the partial region of the upper surface of the rectangular dielectric substrate 10, the additional member 70 serving as the second layer is disposed in the partial region of the upper surface of the additional member 20, and an additional member 80 serving as the third layer is disposed in the partial region of the upper surface of the additional member 70. In plan view, one of the edges of the dielectric substrate 10 is substantially matched with the edge of each of the additional members 20, 70, and 80, and hence a stepped upper surface descending from the edge toward the opposite edge is formed.

On the upper surfaces of the dielectric substrate 10, the additional member 20 serving as the first layer, the additional member 70 serving as the second layer, and the additional member 80 serving as the third layer, the plurality of first radiating elements 31, the plurality of second radiating elements 41, the plurality of third radiating elements 72, and a plurality of fourth radiating elements 82 are disposed, respectively. The first radiating elements 31, the second radiating elements 41, the third radiating elements 72, and the fourth radiating elements 82 form the first antenna elements 30, the second antenna elements 40, the third antenna elements 71, and fourth antenna elements 81, respectively. With the height of the ground plane 11 being a reference, in plan view, the heights of the radiating elements are increased toward a direction in parallel with one of the edges of the dielectric substrate 10.

In the antenna device 50 according to the modification illustrated in FIG. 14, the rectangular dielectric substrate 10, the additional member 20 serving as the first layer, and the additional member 70 serving as the second layer have vertices substantially matched with each other in plan view. The plurality of first radiating elements 31 are disposed in the L-shaped region, in which the additional member 20 serving as the first layer is not disposed, of the upper surface of the dielectric substrate 10 (corresponding to stair tread). The plurality of second radiating elements 41 are disposed in the L-shaped region, in which the additional member 70 serving as the second layer is not disposed, of the upper surface of the additional member 20. The third radiating element 72 is disposed on the upper surface of the additional member 70 serving as the second layer. With the height of the ground plane 11 being a reference, in plan view, the heights of the radiating elements are increased toward one of the vertices of the dielectric substrate 10.

Next, the excellent effects of the sixth embodiment and the modifications thereof are described.

As described above, in the sixth embodiment and the modifications thereof, the plurality of radiating elements different from each other in height from the ground plane 11 are two-dimensionally disposed. The shapes of the regions different from each other in height are adjusted depending on the unevenness of the inner surface of a casing to make it possible to flexibly support various casings. Further, there is also an effect that the directivity of the antenna device 50 is changed depending on the aspect of the two-dimensional distribution of the plurality of radiating elements different from each other in height.

In the sixth embodiment and the modification thereof illustrated in FIG. 11 and FIG. 12, in plan view, the plurality of radiating elements 31 and 41 are disposed in the matrix with the three rows and the five columns, but the radiating elements 31 and 41 may be disposed in a matrix with any number of rows and columns. For example, the radiating elements 31 and 41 may be disposed in a matrix with three rows and three columns, three rows and four columns, or the like. In the modification illustrated in FIG. 13, with the row direction being the direction in which the stepped upper surface is inclined, the plurality of radiating elements 31, 41, 72, and 82 are disposed in the matrix with the three rows and the five columns, but the radiating elements 31, 41, 72, and 82 may be disposed in a matrix with any number of rows and columns. For example, the radiating elements 31, 41, 72, and 82 may be disposed in a matrix with three rows and three columns, three rows and four columns, or the like. In the modification illustrated in FIG. 14, in plan view, the plurality of radiating elements 31, 41, and 72 are disposed in the matrix with the three rows and the three columns, but the radiating elements 31, 41, and 72 may be disposed in a matrix with any number of rows and columns. For example, the radiating elements 31, 41, and 72 may be disposed in a matrix with two rows and three columns, two rows and four columns, or the like.

Each embodiment described above is exemplary, and it goes without saying that the configurations described in the different embodiments can be partially replaced or combined. The similar actions and effects provided by the similar configurations of the plurality of embodiments are not stated one by one in each embodiment. Moreover, the present invention is not limited to the embodiments described above. For example, it will be apparent to those skilled in the art that various changes, improvements, combinations, and the like can be made.

REFERENCE SIGNS LIST

10 dielectric substrate
11 ground plane
12 feed line
20 additional member
20S riser surface
21 feed line
22 solder
23 reflective member
30 first antenna element
31 first feed conductor
32*x*, 32*y* feed point
40 second antenna element
41 second radiating element
42*x*, 42*y* feed point
43 parasitic element
50 antenna device
51 radio-frequency integrated circuit element (RFIC)
52 baseband integrated circuit element (BBIC)
60 casing
61 cylindrical surface
70 additional member
71 third antenna element
72 third radiating element
80 additional member
81 fourth antenna element
82 fourth radiating element

The invention claimed is:

1. An antenna device comprising:
a dielectric substrate;
a ground plane disposed on or in an inner layer of the dielectric substrate;
a feed line disposed on or in the dielectric substrate;
a first antenna element supported on the dielectric substrate; and
a second antenna element supported on a dielectric member disposed on the dielectric substrate,
wherein
the first antenna element and the second antenna element include a first radiating element and a second radiating element connected to the feed line, respectively, and are disposed on a same side of the dielectric substrate as viewed from the ground plane,
with a height of the ground plane being a reference, a top portion of the second antenna element is located higher than a top portion of the first antenna element,
the first antenna element and the second antenna element constitute an array antenna,
the first radiating element and the ground plane constitute a patch antenna,
the second radiating element and the ground plane constitute a patch antenna, and
on an upper surface of the dielectric substrate, the dielectric member that has a permittivity lower than a permittivity of the dielectric substrate is disposed.

2. The antenna device according to claim 1, wherein
the second radiating element is disposed higher than the first radiating element.

3. The antenna device according to claim 2, wherein
the upper surface of the dielectric substrate is flat.

4. The antenna device according to claim 3, wherein
the second antenna element includes a parasitic element disposed higher, with respect to the ground plane, than the first radiating element, and
the parasitic element is electromagnetically coupled to the second radiating element.

5. The antenna device according to claim 3, wherein
in plan view, between the first antenna element and the second antenna element, the dielectric member includes a riser surface that defines a region in which the second antenna element is disposed and is higher, with respect to the ground plane, than a region in which the first antenna element is disposed, and
the riser surface has attached thereto a reflective member configured to reflect a radio wave.

6. The antenna device according to claim 2, wherein
the second antenna element includes a parasitic element disposed higher, with respect to the ground plane, than the first radiating element, and
the parasitic element is electromagnetically coupled to the second radiating element.

7. The antenna device according to claim 2, wherein
in plan view, between the first antenna element and the second antenna element, the dielectric member includes a riser surface that defines a region in which the second antenna element is disposed and is higher, with respect to the ground plane, than a region in which the first antenna element is disposed, and
the riser surface has attached thereto a reflective member configured to reflect a radio wave.

8. The antenna device according to claim 1, wherein
the upper surface of the dielectric substrate is flat.

9. The antenna device according to claim 8, wherein
the second antenna element includes a parasitic element disposed higher, with respect to the ground plane, than the first radiating element, and
the parasitic element is electromagnetically coupled to the second radiating element.

10. The antenna device according to claim 8, wherein
in plan view, between the first antenna element and the second antenna element, the dielectric member includes a riser surface that defines a region in which the second antenna element is disposed and is higher, with respect to the ground plane, than a region in which the first antenna element is disposed, and
the riser surface has attached thereto a reflective member configured to reflect a radio wave.

11. The antenna device according to claim 1, wherein
the second antenna element includes a parasitic element disposed higher, with respect to the ground plane, than the first radiating element, and
the parasitic element is electromagnetically coupled to the second radiating element.

12. The antenna device according to claim 1, wherein
in plan view, between the first antenna element and the second antenna element, wherein the dielectric member includes a riser surface that defines a region in which the second antenna element is disposed and is higher, with respect to the ground plane, than a region in which the first antenna element is disposed, and
the riser surface has attached thereto a reflective member configured to reflect a radio wave.

13. The antenna device according to claim 1, wherein
an operating frequency of the first antenna element is the same as an operating frequency of the second antenna element.

14. A communication device comprising:
an antenna device that includes
a dielectric substrate,
a ground plane disposed on or in an inner layer of the dielectric substrate,
a feed line disposed on or in the dielectric substrate, and
a first antenna element supported on the dielectric substrate; and
a second antenna element supported on a dielectric member disposed on the dielectric substrate, wherein
the first antenna element and the second antenna element include a first radiating element and a second radiating element connected to the feed line, respectively, and are disposed on a same side of the dielectric substrate as viewed from the ground plane,
with a height of the ground plane being a reference, a top portion of the second antenna element is located higher than a top portion of the first antenna element,
the first antenna element and the second antenna element constitute an array antenna,
the first radiating element and the ground plane constitute a patch antenna, and
the second radiating element and the ground plane constitute a patch antenna;
a casing configured to accommodate the antenna device; and
a radio-frequency integrated circuit element accommodated in the casing and configured to supply a radio-frequency signal to the first radiating element and the second radiating element through the feed line, wherein
the first antenna element and the second antenna element face an inner surface of the casing, and
on an upper surface of the dielectric substrate, the dielectric member that has a permittivity lower than a permittivity of the dielectric substrate is disposed.

15. The communication device according to claim 14, wherein
the second radiating element is disposed higher than the first radiating element.

16. The communication device according to claim 14, wherein
the upper surface of the dielectric substrate is flat.

17. The communication device according to claim 14, wherein
the second antenna element includes a parasitic element disposed higher, with respect to the ground plane, than the first radiating element, and
the parasitic element is electromagnetically coupled to the second radiating element.

18. The communication device according to claim 14, wherein
an operating frequency of the first antenna element is the same as an operating frequency of the second antenna element.

19. The communication device according to claim 14, wherein
with regard to a direction vertical to the ground plane, a distance from the ground plane to the inner surface of the casing through the second antenna element is longer than a distance from the ground plane to the inner surface of the casing through the first antenna element.

20. The communication device according to claim 19, wherein
the inner surface of the casing includes, in part, a cylindrical surface curved to protrude outward with respect to the casing, and
the first antenna element and the second antenna element face the cylindrical surface of the casing.

* * * * *